(12) United States Patent
Wilson et al.

(10) Patent No.: US 9,163,827 B2
(45) Date of Patent: Oct. 20, 2015

(54) SYSTEM AND METHOD FOR USING BOILER FEEDWATER

(71) Applicant: General Electric Company, Schenectady, NY (US)

(72) Inventors: John Caleb Wilson, Houston, TX (US); Leroy Omar Tomlinson, Houston, TX (US); George Frederick Frey, Houston, TX (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 13/666,893

(22) Filed: Nov. 1, 2012

(65) Prior Publication Data

US 2014/0116049 A1   May 1, 2014

(51) Int. Cl.
| | |
|---|---|
| *F01K 13/00* | (2006.01) |
| *F01K 13/02* | (2006.01) |
| *F01K 7/40* | (2006.01) |
| *F01B 21/04* | (2006.01) |
| *F01K 23/10* | (2006.01) |
| *F02C 6/00* | (2006.01) |
| *F02C 6/18* | (2006.01) |
| *F22B 1/18* | (2006.01) |
| *C10J 3/72* | (2006.01) |
| *F02C 3/28* | (2006.01) |

(52) U.S. Cl.
CPC ............... *F22B 1/1815* (2013.01); *C10J 3/721* (2013.01); *F01K 23/10* (2013.01); *F02C 3/28* (2013.01); *F02C 6/18* (2013.01); *C10J 2300/093* (2013.01); *C10J 2300/1653* (2013.01); *C10J 2300/1884* (2013.01); *F05D 2220/722* (2013.01); *Y02E 20/16* (2013.01); *Y02E 20/18* (2013.01)

(58) Field of Classification Search
CPC ..... F01K 23/10; F01K 23/063; F01K 23/067; F02C 6/18; Y02E 20/14; Y02E 20/16; Y02E 20/18; C10J 2300/1653
USPC ............ 60/667, 676, 677, 698, 39.15, 39.182
See application file for complete search history.

(56) References Cited

U.S. PATENT DOCUMENTS

| | | | | |
|---|---|---|---|---|
| 3,879,616 | A | * | 4/1975 | Baker et al. ................. 290/40 R |
| 3,919,839 | A | * | 11/1975 | Aguet ........................ 60/39.182 |
| 4,031,404 | A | * | 6/1977 | Martz et al. ................. 290/40 R |
| 4,099,374 | A | * | 7/1978 | Foster-Pegg ................. 60/39.12 |
| 4,552,099 | A | * | 11/1985 | Martens et al. ............ 122/451.1 |
| 4,891,937 | A | * | 1/1990 | Noguchi et al. ............ 60/39.182 |
| 5,109,665 | A | * | 5/1992 | Hoizumi et al. ........... 60/39.182 |
| 5,379,588 | A | * | 1/1995 | Tomlinson et al. ........ 60/39.182 |
| 5,647,199 | A | * | 7/1997 | Smith ............................. 60/783 |
| 5,704,206 | A | * | 1/1998 | Kaneko et al. ............... 60/39.12 |
| 6,032,456 | A | * | 3/2000 | Easom et al. ................... 60/793 |
| 6,397,575 | B2 | | 6/2002 | Tomlinson et al. |
| 6,430,915 | B1 | * | 8/2002 | Wiant et al. ................. 60/39.12 |
| 7,266,940 | B2 | * | 9/2007 | Balan et al. ............... 60/39.181 |
| 7,621,133 | B2 | | 11/2009 | Tomlinson et al. |
| 7,861,509 | B2 | * | 1/2011 | Russ et al. ................. 60/39.094 |
| 7,874,162 | B2 | | 1/2011 | Tomlinson et al. |

(Continued)

*Primary Examiner* — Thomas Denion
*Assistant Examiner* — Jessica Kebea
(74) *Attorney, Agent, or Firm* — Fletcher Yoder, P.C.

(57) ABSTRACT

A system includes a first steam generator configured to generate a first boiler feedwater, a second steam generator configured to generate a second boiler feedwater, a common boiler feedwater configured to combine the first boiler feedwater and the second boiler feedwater to produce a common boiler feedwater, and a heater configured to receive the common boiler feedwater to heat a gas.

21 Claims, 2 Drawing Sheets

(56) References Cited

U.S. PATENT DOCUMENTS

| | | | |
|---|---|---|---|
| 7,895,822 B2* | 3/2011 | Hoffmann et al. | 60/39.5 |
| 8,715,379 B2* | 5/2014 | Briesch et al. | 48/61 |
| 2006/0112696 A1* | 6/2006 | Lynghjem et al. | 60/772 |
| 2008/0104939 A1* | 5/2008 | Hoffmann et al. | 60/39.5 |
| 2010/0263376 A1* | 10/2010 | Smith | 60/645 |
| 2011/0036096 A1* | 2/2011 | Bommareddy et al. | 60/780 |
| 2011/0061298 A1* | 3/2011 | Frey et al. | 48/78 |
| 2011/0162380 A1* | 7/2011 | Thacker et al. | 60/780 |
| 2011/0289930 A1* | 12/2011 | Draper | 60/772 |
| 2012/0079766 A1* | 4/2012 | Briesch et al. | 48/61 |
| 2012/0317973 A1* | 12/2012 | Gulen | 60/597 |

* cited by examiner

SYSTEM AND METHOD FOR USING BOILER FEEDWATER

BACKGROUND OF THE INVENTION

The subject matter disclosed herein relates to using boiler feedwater, and more specifically, to using boiler feedwater supplied by two or more steam generators.

In general, an integrated gasification combined cycle (IGCC) power plant converts a fuel source into syngas through the use of a gasifier. A typical IGCC gasifier may combine a fuel source (e.g., a coal slurry) with steam and oxygen to produce the syngas. The product syngas may be provided to a combustor to combust the syngas with oxygen to drive one or more gas turbines. Heat from the IGCC power plant may be used to generate steam to drive one or more steam turbines. Certain IGCC power plants may include two or more trains with each train including a gasifier and a gas turbine. Additional piping and/or hardware may be included in such IGCC power plants to help reduce or prevent upsets in one portion of the IGCC power plant from affecting other portions or the entire plant. Such additional hardware and/or piping may increase the cost expenditures associated with these IGCC power plants.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first steam generator configured to generate a first boiler feedwater, a second steam generator configured to generate a second boiler feedwater, a common boiler feedwater configured to combine the first boiler feedwater and the second boiler feedwater to produce a common boiler feedwater, and a heater configured to receive the common boiler feedwater to heat a gas.

In a second embodiment, a system includes instructions disposed on a non-transitory, machine readable medium. The instructions are configured to supply a first boiler feedwater from a first steam generator, supply a second boiler feedwater from a second steam generator, combine the first boiler feedwater and the second boiler feedwater using a common boiler feedwater header to produce a common boiler feedwater, heat a syngas in a syngas heater using the common boiler feedwater to produce a heated syngas, and reduce a first flow rate of the first boiler feedwater to the common boiler feedwater header when a first criterion is reached, reduce a second flow rate of the second boiler feedwater when a second criterion is reached, or any combination thereof.

In a third embodiment, a method includes supplying a first boiler feedwater from a first steam generator, supplying a second boiler feedwater from a second steam generator, combining the first boiler feedwater and the second boiler feedwater using a common boiler feedwater header to produce a common boiler feedwater, heating a syngas in a syngas heater using the common boiler feedwater to produce a heated syngas, and reducing a first flow rate of the first boiler feedwater to the common boiler feedwater header when a first criterion is reached, reducing a second flow rate of the second boiler feedwater when a second criterion is reached, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
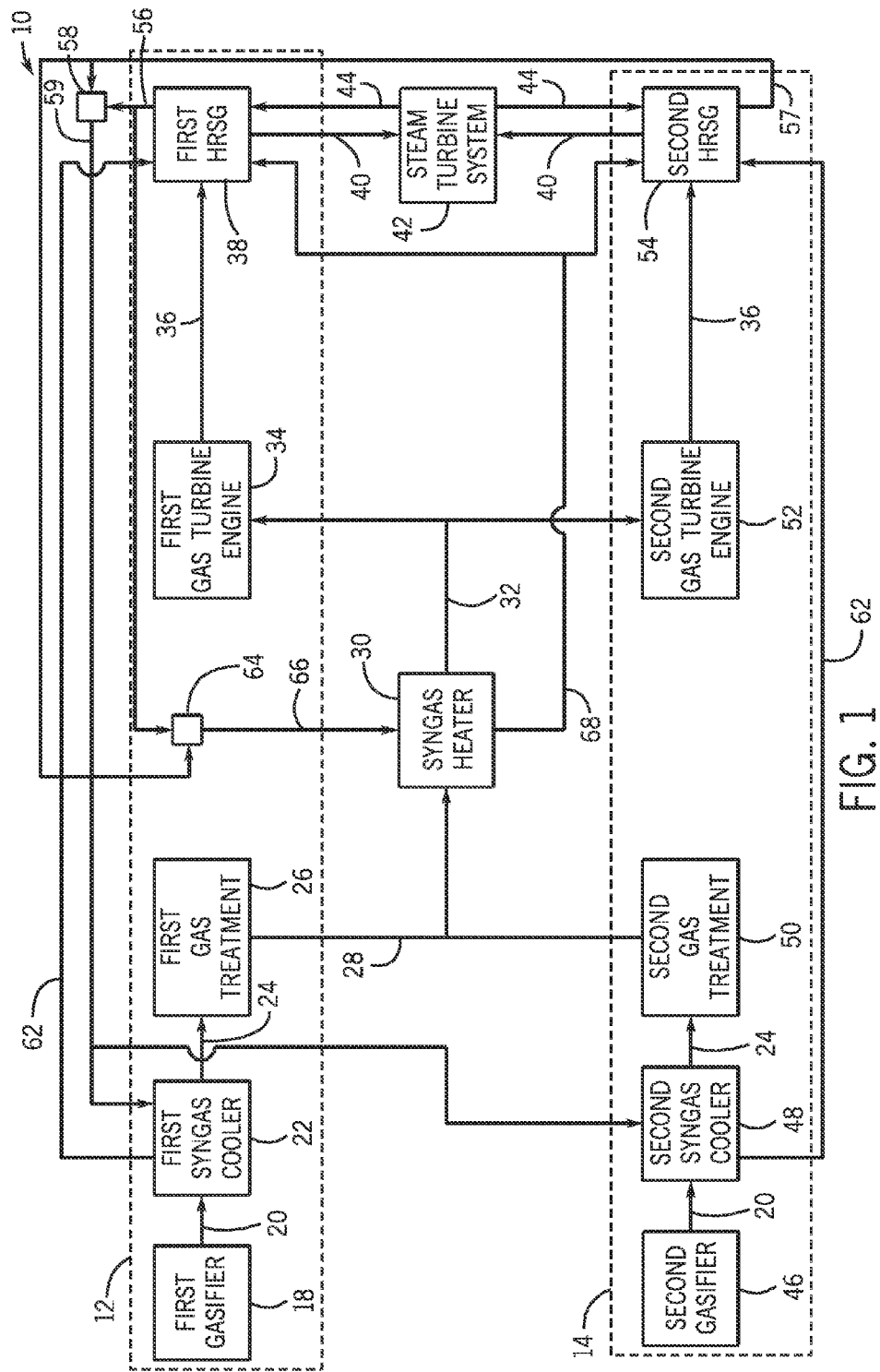
FIG. 1 illustrates a block diagram of an embodiment of a integrated gasification combined cycle (IGCC) power plant having a common boiler feedwater header.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Presently contemplated embodiments of an industrial plant, such as a hydroelectric power plant, a chemical plant, or an integrated gasification combined cycle (IGCC) power plant, use boiler feedwater for various heating and cooling tasks. For example, the boiler feedwater may be used in a cooler to cool a process stream, thereby generating steam or increasing the feedwater temperature from absorbing heat from the process stream. In addition, the boiler feedwater may be used in heaters to increase a temperature of a process stream, thereby generating a cooled boiler feedwater. The IGCC power plant may include one or more heaters and/or coolers that use boiler feedwater. Certain IGCC power plants may include two or more parallel trains. For example, in certain embodiments, each train may include a gasifier, a syngas cooler, a gas treatment system, a gas turbine engine, and a heat recovery steam generator (HRSG). Such parallel trains may provide operational flexibility for the IGCC power plant. For example, not all of the trains may be operating at the same time or at the same rate. In certain IGCC power plants, some equipment may be shared between the parallel trains. For example, in certain embodiments, the trains may share a syngas heater and/or a steam turbine.

In one disclosed embodiment, a first steam generator and a second steam generator may both produce steam. For example, the first steam generator may be a first HRSG and the second steam generator may be a second HRSG. The first and second HRSGs may generate steam by exchanging heat from the hot exhaust gases produced by first and second gas turbine engines with boiler feedwater to generate steam. Boiler feedwater may refer to water specially conditioned to avoid problems in boilers and heat exchangers used to produce steam. For example, boiler feedwater may be of high quality or purity and contain few impurities. In addition to generating steam, the first and second HRSGs may also be used to supply a first boiler feedwater and a second boiler feedwater to a common boiler feedwater header to combine the first and second boiler feedwater to produce a common boiler feedwater. In certain embodiments, the common boiler feedwater may be received by a heater, such as a syngas heater, to heat a gas, such as syngas. In such embodiments, the common boiler feedwater header may be referred to as a syngas heater (SGH) feedwater header and the common boiler feedwater referred to as a SGH feedwater. The heated syngas may be combusted in one or more combustion systems, such as the first and second gas turbine engines. In other embodiments, a second common boiler feedwater header may combine the first and second boiler feedwater to produce a second common boiler feedwater that is used for cooling. For example, the second common boiler feedwater may be supplied to first and second syngas coolers to cool syngas generated by first and second gasifiers, respectively. In such embodiments, the second common boiler feedwater header may be referred to as a syngas cooler (SGC) feedwater header and the second common boiler feedwater referred to as a SGC feedwater.

Using the common SGH header may provide several advantages for the IGCC power plant. For example, the SGH header may improve the reliability and/or availability of the IGCC power plant. In certain situations, the flow rate of the first boiler feedwater may be affected by operation of the first HRSG and the flow rate of the second boiler feedwater may be affected by operation of the second HRSG. For example, a startup, shutdown, turndown, transition, or asymmetrical loading of the first HRSG may cause a first flow rate of the first boiler feedwater to decrease below a first normal flow rate. Similar conditions may cause a second flow rate of the second boiler feedwater to decrease below a second normal flow rate. Additionally or alternatively, such conditions may cause a temperature and/or pressure of the boiler feedwater produced by the HRSG to decrease below a normal temperature or normal pressure. Such conditions affecting one of the two HRSGs may cause disturbances in the flow rate and/or other conditions of the SGH feedwater and/or SGC feedwater. Thus, disturbances in the operation of one or more of the HRSGs may affect the operation of the syngas heater and/or syngas coolers. Thus, in certain embodiments, the first flow rate of the first boiler feedwater to the SGH header or SGC header may be reduced when a first criterion is reached. Examples of the first criterion include, but are not limited to, process upsets, temperature conditions, and/or pressure conditions. Similarly, the second flow rate of the second boiler feedwater to the SGH header or SGC header may be reduced when a second criterion is reached. By reducing the flow rate of the affected boiler feedwater, the impact to the conditions of the common boiler feedwater may be reduced, thereby reducing any impact on the operation of downstream equipment, such as the syngas heater and syngas coolers. When implemented by a controller or control system, such a control scheme may be a simple and reliable method for controlling the IGCC power plant during asymmetric plant loading (e.g., when one or more of the trains of the IGCC power plant are operating at less than normal rates).

With the foregoing in mind, FIG. 1 is a diagram of an integrated gasification combined cycle (IGCC) power plant 10 with two or more parallel trains. Specifically the IGCC power plant 10 includes a first train 12 and a second train 14. In other embodiments, the IGCC power plant 10 may include 3, 4, 5, or more parallel trains. The first train 12 may include a first gasifier 18 that converts fuel and oxygen into syngas 20 (e.g., a combination of carbon monoxide and hydrogen). The syngas 20 produced by the first gasifier 18 may then be transferred to a first syngas cooler 22 to reduce a temperature of the syngas 20. Specifically, the first syngas cooler 22 may be a convective syngas cooler or a radiant syngas cooler that uses a coolant (e.g., SGC feedwater) to cool the syngas 20. Cooled syngas 24 from the first syngas cooler 22 may then be transferred to a first gas treatment system 26, which may remove one or more various gases, such as acid gases or hydrogen sulfide, salts, and/or particulates from the cooled syngas 24. Treated syngas 28 from the first gas treatment system 26 may then be transferred to a syngas heater 30, which may use a heat transfer fluid (e.g., SGH feedwater) to heat the treated syngas 28. Heated syngas 32 from the syngas heater 30 may then be transferred to a first gas turbine engine 34 to be combusted. Thus, the syngas heater 30 may be used to achieve a certain temperature of the heated syngas 32 that improves the efficiency of the IGCC power plant 10. Hot exhaust gases 36 produced via the combustion of the heated syngas 32 in the first gas turbine engine 34 may be conducted to a first heat recovery steam generator (HRSG) 38 to produce steam 40 that is then used to drive a steam turbine located in a steam turbine system 42. The steam turbine uses the steam to drive a load, such as a generator, and returns feedwater 44 to the first HRSG 38 to be heated by the hot exhaust gases 36 to generate additional steam 40.

The second train 14 of the IGCC power plant 10 may be arranged in a similar manner to the first train 12. For example, the second train 14 may include a second gasifier 46 that generates syngas 20 that is then transferred to a second syngas cooler 48 to generate the cooled syngas 24. A second gas treatment system 50 may receive the cooled syngas 24 and transfer treated syngas 28 to the syngas heater 30. As shown in FIG. 1, the syngas heater 30 is shared between the first and second trains 12 and 14. In other words, the treated syngas 28 from the first and second gas treatment systems 26 and 50 is combined prior to being transferred to the syngas heater 30. Next, the heated syngas 32 from the syngas heater 30 is transferred to a second gas turbine engine 52 to be combusted to produce the hot exhaust gases 36. As shown in FIG. 1, the heated syngas 32 is split between the first and second trains 12 and 14. For example, one or more control valves or similar devices may be used to adjust the split of the heated syngas 32 between the first and second trains 12 and 14. Next, a second HRSG 54 receives the hot exhaust gases 36 to generate steam 40 that is used in the steam turbine system 42. As shown in FIG. 1, the steam turbine system 42 is also shared between the first and second trains 12 and 14. Feedwater 44 is returned from the steam turbine system 42 to the second HRSG 54 to generate additional steam 40.

The first HRSG 38 may also supply a first boiler feedwater 56, which may be generated from condensed steam in the first HRSG 38. Similarly, the second HRSG 54 may supply a second boiler feedwater 57. In other embodiments, steam generators other than the HRSGs 38 and 54 may be used to supply the first and second boiler feedwaters 56 and 57. As the first and second HRSGs 38 and 54 may not be operating at the same capacities or operating conditions, properties of the first and second boiler feedwaters 56 and 57 may not be the same. For example, one or more properties, such as temperature, pressure, and/or flow rate, of the first and second boiler feedwaters 56 and 57 may differ from one another. As shown in FIG. 1, the first and second boiler feedwaters 56 and 57 may be combined in a SGC feedwater header 58 to supply a SGC feedwater 59 that may be used for cooling in the IGCC power plant 10. For example, the SGC feedwater 59 may be used to cool the syngas 20 in the first and second syngas coolers 22 and 48. Specifically, the SGC feedwater 59 may absorb heat from the syngas 20 in the first and second syngas coolers 22 and 48 to generate steam 62 that is returned to the first and second HRSGs 38 and 54. In other embodiments, the SGC feedwater 59 may be used in other coolers in the IGCC power plant 10. As shown in FIG. 1, use of the SGC feedwater header 58 may help reduce the amount of piping used for conveying boiler feedwater to the first and second syngas coolers 22 and 48. In other words, separate lines from the first and second HRSGs 38 and 54 to the first and second syngas coolers 22 and 48 may be omitted.

In addition, as shown in FIG. 1, the first and second boiler feedwaters 56 and 57 may be combined in a SGH feedwater header 64 to supply a SGH feedwater 66 that may be used for heating in the IGCC power plant 10. For example, the SGH feedwater 66 may be used to heat the treated syngas 28 in the syngas heater 30. Specifically, the common SGH feedwater 66 may be conveyed to the syngas heater 30 to heat the treated syngas 28 to produce the heated syngas 32. Cooled SGH feedwater 68 may be returned from the syngas heater 30 back to the first and second HRSGs 38 and 54. In other embodiments, the common SGH feedwater 66 may be used in other heaters in the IGCC power plant 10. As described in detail below, the separate SGC and SGH headers 58 and 64 enable cooling and heating within the IGCC power plant 10 to be individually controlled. In addition, by combining the first and second boiler feedwaters 56 and 57, the effects of process upsets or other shutdowns of the individual HRSGs 38 and 54 may be reduced.

Figure 2:
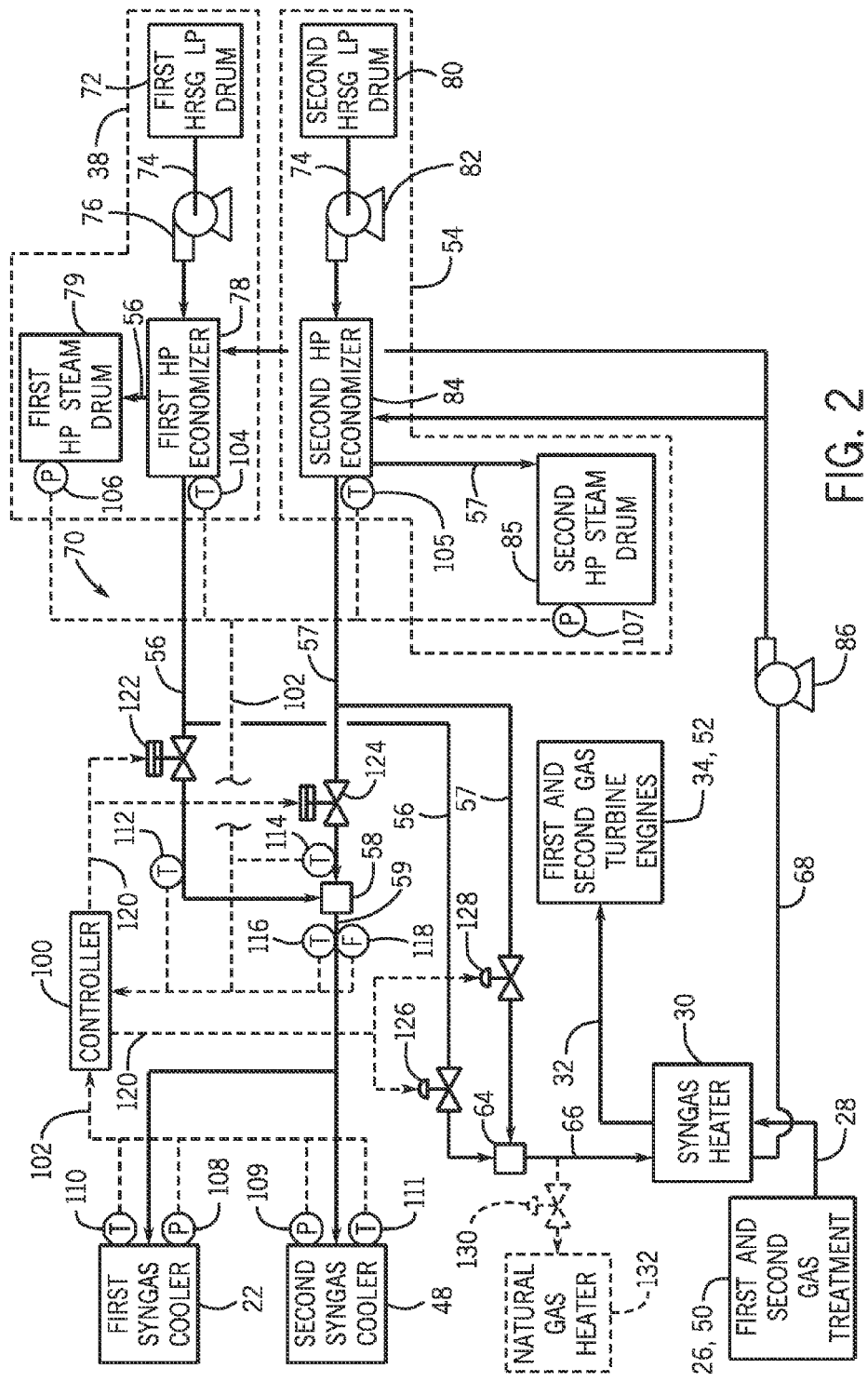
FIG. 2 illustrates a block diagram of an embodiment of a portion of an IGCC power plant having a common boiler feedwater header.

FIG. 2 is a block diagram of a portion 70 of the IGCC power plant 10 illustrating control of the IGCC power plant. Elements in FIG. 2 in common with those shown in FIG. 1 are labeled with the same reference numerals. Specific components of the first and second HRSGs 38 and 54 are shown in FIG. 2. For example, the first HRSG 38 includes a first HRSG low pressure (LP) drum 72 that supplies a high pressure (HP) boiler feedwater 74. A first HP feedwater pump 76 may be used to convey the HP boiler feedwater 74 to a first HP economizer 78. An economizer may be a heat exchange device that heats water, such as boiler feedwater. As shown in FIG. 2, some of the first boiler feedwater 56 is extracted from the first HP economizer 78 and supplied to a first HP steam drum 79. The rest of the first boiler feedwater 56 is extracted from the first HP economizer 78 and supplied to the SGC feedwater header 58 and the SGH feedwater header 64. Similarly, the second HRSG 54 may include a second HRSG LP drum 80 that supplies HP boiler feedwater 74 that is then conveyed via a second HP feedwater pump 82 to a second HP economizer 84. As shown in FIG. 2, some of the second boiler feedwater 57 is extracted from the second HP economizer 84 and supplied to a second HP steam drum 85. The rest of the second boiler feedwater 57 is extracted from the second HP economizer 84 and supplied to the SGC feedwater header 58 and the SGH feedwater header 64

As further shown in FIG. 2, the first and second boiler feedwaters 56 and 57 are combined to supply the SGC feedwater 59 conveyed by the SGC feedwater header 58. In addition, the first and second boiler feedwaters 56 and 57 are combined to supply the SGH feedwater 66 conveyed by the SGH feedwater header 64. The cooled SGH feedwater 68 from the syngas heater 30 is conveyed to the first and second HP economizers 78 and 84 via a cooled SGH feedwater pump 86. In other embodiments, the first and second HRSGs 38 and 54 may be configured differently (e.g., include more, less, or different equipment) to supply the first and second boiler feedwaters 56 and 57.

A controller 100 may be used to control various aspects of the portion 70 of the IGCC power plant 10 shown in FIG. 2. In certain embodiments, the controller 100 may execute computer-implemented processes and include apparatuses for practicing those processes. In some embodiments, the controller 100 may include a computer program product having computer program code containing instructions embodied in non-transitory tangible media, such as floppy diskettes, CD-ROMs, hard drives, USB (universal serial bus) drives, or any other computer-readable or machine-readable storage medium, wherein, when the computer program code is loaded into and executed by a computer, the computer becomes an apparatus for practicing certain embodiments. In further embodiments, the controller 100 may include computer program code, for example, whether stored in a storage medium, loaded into and/or executed by a computer, or transmitted over some transmission medium, such as over electrical wiring or cabling, through fiber optics, or via wireless transmission, wherein when the computer program code is loaded into and executed by a computer, the computer becomes an apparatus for practicing certain embodiments. When implemented on a general-purpose processor, the computer program code segments configure the processor to create specific logic circuits. Specifically, the controller 100 may include computer code disposed on a computer-readable storage medium or be a process controller that includes such a computer-readable storage medium. The computer code may include instructions for reducing a first flow rate of the first boiler feedwater 56 to the SGH header 64 when a first criterion is reached, for reducing a second flow rate of the second boiler feedwater 57 to the SGH header 64 when a second criterion is reached, or any combination thereof.

Returning to FIG. 2, the controller 100 may receive one or more input signals 102 from a variety of sensors disposed throughout the portion 70 of the IGCC power plant 10. For example, the first HP economizer 78 may include a first temperature sensor 104 and the second HP economizer 84 may include a second temperature sensor 105. In addition, the first HP steam drum 79 may include a first pressure sensor 106 and the second HP steam drum 85 may include a second pressure sensor 107 that convey input signals 102 indicative of the pressures of the first and second HP steam drums 79 and 85, respectively, to the controller 100. Similarly, the first syngas cooler 22 may include a first pressure sensor 108 and the second syngas cooler 48 may include a second pressure sensor 109 to indicate the pressure of the SGC feedwater 59 and/or the steam 62 generated by the coolers 22 and 48. The first syngas cooler 22 may also include a first temperature sensor 110 and the second syngas cooler 48 may include a second temperature sensor 111 to indicate the temperature of the SGC feedwater 59 and/or the steam 62 generated by the coolers 22 and 48. A first temperature sensor 112 may be used to indicate a temperature of the first boiler feedwater 56 and a second temperature sensor 114 may be used to indicate a temperature of the second boiler feedwater 57. A SGC feedwater temperature sensor 116 may be used to indicate a temperature of the SGC feedwater 59 and a SGC flow sensor 118 may be used to indicate a flow rate of the SGC feedwater 59. In other embodiments, additional sensors may be used to provide additional input signals 102 to the controller 100. In further embodiments, the sensors shown in FIG. 2 may be disposed in different locations in the IGCC power plant 10 than those illustrated.

The controller 100 shown in FIG. 2 may use the information provided via the input signals 102 to execute instructions or code contained on a machine-readable or computer-readable storage medium and generate one or more output signals 120 to various control devices, such as control valves or pumps. For example, based on the execution of the execute instructions or code contained on a machine-readable or computer-readable storage medium, the output signals 120 may be used to control a first SGC feedwater control valve 122 and a second SGC feedwater control valve 124 to adjust a flow rate of the first boiler feedwater 56 and a flow rate of the second boiler feedwater 57, respectively, to the SGC header 58. The output signals may also be used to control a first SGH feedwater control valve 126 and a second SGH feedwater control valve 128 to adjust a flow rate of the first boiler feedwater 56 and a flow rate of the second boiler feedwater 57, respectively, to the SGH header 64. In further embodiments, the output signals 120 may be used to control other aspects of the IGCC power plant 10.

In certain embodiments, the controller 100 may execute instructions to reduce the first flow rate of the first boiler feedwater 56 to the SGH header 64 when a first criterion is reached, reduce the second flow rate of the second boiler feedwater 57 to the SGH header 64 when a second criterion is reached, or any combination thereof. For example, the controller 100 may send output signals 120 to the first and second SGH feedwater control valves 126 and 128 to throttle or reduce the first and second flow rates of the first and second boiler feedwaters 56 and 57, respectively. The first and second criteria may be based on a variety of process conditions that may indicate undesirable operation of the IGCC power plant 10. For example, in certain embodiments, the first criterion may be reached when a first temperature of the first boiler feedwater 56, as indicated by first temperature sensors 104 or 112, falls below a first temperature threshold, when a first differential temperature between a second temperature of the second boiler feedwater, as indicated by second temperature sensors 105 or 114, and the first temperature exceeds a differential temperature threshold, or any combination thereof. Any of these situations may indicate that continued use of the first boiler feedwater 56 in the SGH feedwater 66 may negatively affect operation of the syngas heater 30. Thus, by reducing the flow rate of the first boiler feedwater 56 in these situations, any negative impact on the operation of the syngas heater 30 may be reduced. When the operation of the first HRSG 38 returns to normal, the controller 100 may increase the first flow rate of the first boiler feedwater 56 to a normal flow rate. Similarly, the second criterion may be reached when a second temperature of the second boiler feedwater 57 falls below a second temperature threshold, when a second differential temperature between the first temperature and the second temperature exceeds the differential temperature threshold, or any combination thereof. Any of these situations may indicate that continued use of the second boiler feedwater 57 in the SGH feedwater 66 may negatively affect operation of the syngas heater 30. Thus, by reducing the flow rate of the second boiler feedwater 57 in these situations, any negative impact on the operation of the syngas heater 30 may be reduced. When the operation of the second HRSG 54 returns to normal, the controller 100 may increase the second flow rate of the second boiler feedwater 57 to a normal flow rate.

In other embodiments, the first criterion may be reached when a first pressure of the first HP steam drum 79, as indicated by first pressure sensor 106, falls below a first pressure threshold, when a first differential pressure between a second pressure of the second HP steam drum 85, as indicated by second pressure sensor 107, and the first pressure exceeds a differential pressure threshold, or any combination thereof. Any of these situations may indicate that continued use of the first boiler feedwater 56 in the SGH feedwater 66 may negatively affect operation of the syngas heater 30. Similarly, the second criterion may be reached when the second pressure falls below a second pressure threshold, when a second differential pressure between the first pressure and the second pressure exceeds the differential pressure threshold, or any combination thereof. In further embodiments, the first criterion may be reached whenever the first HRSG 38 is not operating normally, such as, but not limited to, when the first HRSG 38 starts up, shuts down, turns down, transitions, or enters asymmetrical loading. Similarly, the second criterion may be reached whenever the second HRSG 54 is not operating normally, such as, but not limited to, when the second HRSG 54 starts up, shuts down, turns down, transitions, or enters asymmetrical loading.

In some embodiments, the controller 100 may execute instructions to reduce the first flow rate of the first boiler feedwater 56 to the SGC header 58 when the first criterion is reached, reduce the second flow rate of the second boiler feedwater 57 to the SGC header 58 when a second criterion is reached, or any combination thereof. Specifically, the controller 100 may send output signals 120 to the first and second SGC feedwater control valves 122 and 124 to throttle or reduce the first and second flow rates of the first and second boiler feedwaters 56 and 57, respectively. In certain embodiments, the first and second SGC feedwater control valves 122 and 124 may be isolation valves that are either open or closed. In such embodiments, the controller 100 may be used to close the valve 122 or 124 when the first or second criterion is reached, respectively.

In certain embodiments, the controller 100 may execute instructions to maintain a temperature of the heated syngas 32 greater than a threshold temperature. In other embodiments, the controller 100 may execute instructions to maintain an approach temperature of the heated syngas 32 greater than a threshold approach temperature. The approach temperature may be defined as the difference in temperature between the heated syngas 32 and the temperature of the SGH feedwater 66 entering the syngas heater 30. The temperature of the heated syngas 32 and/or the approach temperature of the heated syngas 32 may be used as additional criteria in the efficient operation of the first and second gas turbine engines 34 and 52. Specifically, in certain embodiments, it may be desirable to operate the first and second gas turbine engines 34 and 52 only when the temperature of the heated syngas 32 is greater than the threshold temperature and/or the approach temperature of the heated syngas 32 is greater than the threshold approach temperature.

In certain embodiments, the SGH feedwater 66 may be used in other heaters in the IGCC power plant 10. For example, the IGCC power plant 10 may include a natural gas heater 132 that is used to heat natural gas to produce heated natural gas, which may be combusted in the first and second gas turbine engines 34 and 52 when syngas is not available (e.g., during startup or shutdown of the IGCC power plant 10). In such embodiments, the SGH feedwater 66 may be used to heat the natural gas in a manner similar to the heating of the treated syngas 28 in the syngas heater 30. The controller 100 may be used to open a natural gas control valve 130 when the natural gas heater 132 is used. In addition, the controller 100 may be used to help maintain a temperature of the heated natural gas greater than a threshold temperature and/or an approach temperature of the heated natural gas greater than a threshold approach temperature. In further embodiments, the SGC feedwater header 58 and SGH feedwater header 64 may be used to provide the SGC feedwater 59 and SGH feedwater 66, respectively, to other equipment, such as, but not limited to, a gasifier, gas treatment unit, fuel preparation unit, and so forth. In these and other applications, the SGC feedwater 59 and SGH feedwater 66 may be used as a coolant, a heat transfer fluid, to generate steam, and so forth.

Technical effects of the invention include combining the first boiler feedwater 56 and the second boiler feedwater 57 to supply the SGC feedwater 59 using the SGC feedwater header 58 and the SGH feedwater 66 using the SGH feedwater header 64. The SGC feedwater 59 may be used as a coolant in the first and second syngas coolers 22 and 48 and the SGH feedwater 66 may be used to heat the treated syngas 28 in the syngas heater 30. In IGCC power plants 10 that include two or more trains, such as the first train 12 and the second train 14, use of the SGC feedwater header 58 may help reduce the amount of piping and/or equipment in the IGCC power plant 10, thereby reducing costs and capital expenditures. In certain embodiments, the controller 100 may be used to reduce the first flow rate of the first boiler feedwater 56 when the first criterion is reached, reduce the second flow rate of the second boiler feedwater 56 when the second criterion is reached, or any combination thereof. Thus, the controller 100 may be used to help maintain desired operation of the syngas heater 30 in response to changes and/or upsets in one or more of the trains 12 and 14 of the IGCC power plant 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a first steam generator configured to supply a first boiler feedwater;
a second steam generator configured to supply a second boiler feedwater;
a first common boiler feedwater header configured to combine the first boiler feedwater and the second boiler feedwater to produce a first common boiler feedwater;
a second common boiler feedwater header configured to combine the first boiler feedwater and the second boiler feedwater to produce a second common boiler feedwater;
a first heat exchanger configured to receive the first common boiler feedwater to transfer heat between the first common boiler feedwater and a first gas; and
a controller comprising an input configured to receive a sensor feedback from a sensor measuring at least one property of the supply of the first boiler feedwater or the supply of the second boiler feedwater, wherein the controller is responsive to the sensor feedback received via the input to control at least one of the supply of the first boiler feedwater or the supply of the second boiler feedwater when the sensor feedback received via the input is indicative of non-compliance with a first threshold.

2. The system of claim 1, wherein the first steam generator comprises a first heat recovery steam generator (HRSG) and the second steam generator comprises a second HRSG.

3. The system of claim 1, comprising—
a second heat exchanger configured to receive the second common boiler feedwater to transfer heat between the second common boiler feedwater and a second gas,
wherein the controller is responsive to the sensor feedback received via the input to control at least one of the supply of the first boiler feedwater or the supply of the second boiler feedwater when the sensor feedback is indicative of non-compliance with the first threshold of the second boiler feedwater.

4. The system of claim 1, comprising:
a first control valve configured to adjust a first flow rate of the first boiler feedwater; and
a second control valve configured to adjust a second flow rate of the second boiler feedwater, wherein the controller is configured to selectively control at least one of the first control valve to control the supply of the first boiler feedwater or the second control valve to control the supply of the second boiler feedwater when the sensor feedback received via the input is indicative of non-compliance with the first threshold.

5. The system of claim 1, wherein the system comprises a second heat exchanger configured to receive the second common boiler feedwater to transfer heat between the second common boiler feedwater and a second gas, wherein the first heat exchanger comprises a gas heater and the second heat exchanger comprises a gas cooler.

6. The system of claim 1, wherein the first heat exchanger comprises a syngas heater or a syngas cooler.

7. A non-transitory, machine readable medium, comprising instructions to:
control a supply of a first boiler feedwater from a first steam generator;
control a supply of a second boiler feedwater from a second steam generator, wherein the first boiler feedwater and the second boiler feedwater combine using first and second boiler feedwater headers to produce first and second common boiler feedwaters, wherein a first fuel gas is cooled in a fuel gas cooler using the first common boiler feedwater to produce a cooled first fuel gas, wherein a second fuel gas is heated in a fuel gas heater using the second common boiler feedwater to produce a heated second fuel gas;
receive an input from a sensor measuring at least one property of the first boiler feedwater, the second boiler feedwater, the first fuel gas, or the second fuel gas; and
control, in response to a sensor input, at least one of the supply of the first boiler feedwater or the supply of the second boiler feedwater, wherein the sensor input is indicative of non-compliance with a threshold for at least one property of the supply of the first boiler feedwater or the supply of the second boiler feedwater.

8. The non-transitory, machine readable medium of claim 7, wherein the sensor input indicative of the non-compliance with the threshold indicates a deviation in conditions between the first and second steam generators, wherein the deviation in conditions comprises a startup condition, or a shutdown condition, or a turn down condition, or a transition condition, or an asymmetrical load condition.

9. The non-transitory, machine readable medium of claim 7, wherein the instructions are configured to reduce a first flow rate of the first boiler feedwater to the first or second common boiler feedwater header when a first criterion is reached, or reduce a second flow rate of the second boiler feedwater when a second criterion is reached.

10. The non-transitory, machine readable medium of claim 9,
wherein the first criterion comprises a first temperature of the first boiler feedwater below a first temperature threshold, or a first differential temperature between a second temperature of the second boiler feedwater and the first temperature above a differential temperature threshold; and
wherein the second criterion comprises the second temperature below a second temperature threshold, or a second differential temperature between the first temperature and the second temperature above the differential temperature threshold.

11. The non-transitory, machine readable medium of claim 9,
wherein the first criterion comprises a first pressure of a first high-pressure steam drum below a first pressure threshold, or a first differential pressure between a second pressure of a second high-pressure steam drum and the first pressure above a differential pressure threshold; and
wherein the second criterion comprises the second pressure below a second pressure threshold, or a second differential pressure between the first pressure and the second pressure above the differential pressure threshold.

12. The non-transitory, machine readable medium of claim 9,
wherein the first criterion comprises the first steam generator starting up, or shutting down, or turning down, or transitioning, or entering asymmetrical loading; and
wherein the second criterion comprises the second steam generator starting up, or shutting down, or turning down, or transitioning, or entering asymmetrical loading.

13. A method, comprising:
supplying a first boiler feedwater from a first steam generator;
supplying a second boiler feedwater from a second steam generator;
combining the first boiler feedwater and the second boiler feedwater using first and second common boiler feedwater headers to produce first and second common boiler feedwaters;
cooling a first fuel gas in a fuel gas cooler using the first common boiler feedwater to produce a cooled first fuel gas;
heating a second fuel gas in a fuel gas heater using the second common boiler feedwater to produce a heated second fuel gas; and
controlling, in response to sensor input, at least one of supplying the first boiler feedwater or supplying the second boiler feedwater, wherein the sensor input is indicative of non-compliance with a threshold for at least one property of the supply of the first boiler feedwater or the supply of the second boiler feedwater.

14. The method of claim 13, wherein the sensor input indicative of the non-compliance with the threshold indicates a deviation in conditions between the first and second steam generators, wherein the deviation in conditions comprises a startup condition, or a shutdown condition, or a turn down condition, or a transition condition, or an asymmetrical load condition.

15. The method of claim 13, wherein controlling, in response to the sensor input, comprises reducing a first flow rate of the first boiler feedwater to the first or second common boiler feedwater header when a first criterion is reached, or reducing a second flow rate of the second boiler feedwater when a second criterion is reached.

16. The method of claim 15,
wherein the first criterion comprises a first temperature of the first boiler feedwater below a first temperature threshold, or a first differential temperature between a second temperature of the second boiler feedwater and the first temperature above a differential temperature threshold; and
wherein the second criterion comprises the second temperature below a second temperature threshold, or a second differential temperature between the first temperature and the second temperature above the differential temperature threshold.

17. The method of claim 15,
wherein the first criterion comprises a first pressure of a first high-pressure steam drum below a first pressure threshold, or a first differential pressure between a second pressure of a second high-pressure steam drum and the first pressure above a differential pressure threshold; and
wherein the second criterion comprises the second pressure below a second pressure threshold, or a second differential pressure between the first pressure and the second pressure above the differential pressure threshold.

18. The method of claim 15,
wherein the first criterion comprises the first steam generator starting up, or shutting down, or turning down, or transitioning, or entering asymmetrical loading; and
wherein the second criterion comprises the second steam generator starting up, or shutting down, or turning down, or transitioning, or entering asymmetrical loading.

19. The method of claim 13, wherein cooling the first fuel gas comprises cooling a first syngas in a first syngas cooler using the first common boiler feedwater and cooling a second syngas in a second syngas cooler using the first common boiler feedwater, wherein heating the second fuel gas comprises heating the first and second syngas cooled by the first and second syngas coolers.

20. The system of claim 1, wherein the controller is responsive to the sensor feedback received via the input of the controller to maintain compliance with the first threshold by reducing use of a non-compliant one of the first or second boiler feedwater based on a comparison of the sensor feedback with the first threshold.

21. The system of claim 1, wherein the first threshold comprises a threshold level or a threshold deviation in temperature, or pressure, or flow rate.

* * * * *